United States Patent
Ethington, Jr. et al.

(10) Patent No.: US 6,692,789 B2
(45) Date of Patent: Feb. 17, 2004

(54) REDUCED FAT SPREADABLE CORN SYRUP COMPOSITIONS AND METHODS OF PREPARATION THEREOF

(75) Inventors: Reed T. Ethington, Jr., Marshall, MN (US); Tedford A. Gillett, Paradise, UT (US)

(73) Assignee: Archer Daniels Midland Company, Decatur, IL (US)

( * ) Notice: Subject to any disclaimer, the term of this patent is extended or adjusted under 35 U.S.C. 154(b) by 0 days.

(21) Appl. No.: 09/883,799

(22) Filed: Jun. 18, 2001

(65) Prior Publication Data

US 2002/0150665 A1 Oct. 17, 2002

(Under 37 CFR 1.47)

Related U.S. Application Data

(60) Provisional application No. 60/213,406, filed on Jun. 22, 2000.

(51) Int. Cl.[7] ................................................ A23D 7/015
(52) U.S. Cl. ........................ 426/613; 426/602; 426/603; 426/639; 426/658
(58) Field of Search ................................. 426/602, 603, 426/613, 658, 639

(56) References Cited

U.S. PATENT DOCUMENTS

| | | | |
|---|---|---|---|
| 3,903,311 A | * 9/1975 | Billerbeck et al. | 426/324 |
| 4,226,895 A | * 10/1980 | Miller et al. | 426/658 |
| 4,532,143 A | 7/1985 | Brain et al. | |
| 4,761,292 A | * 8/1988 | Augustine et al. | 426/321 |
| 4,762,725 A | * 8/1988 | Player et al. | 426/582 |
| 5,102,680 A | * 4/1992 | Glass et al. | 426/572 |
| 5,376,399 A | 12/1994 | Dreese et al. | |
| 5,468,513 A | 11/1995 | Fackrell et al. | |
| 5,492,715 A | * 2/1996 | Greenland et al. | 426/658 |
| 5,501,869 A | 3/1996 | Buliga et al. | |
| 5,508,057 A | * 4/1996 | Wong et al. | 426/633 |
| 5,571,555 A | 11/1996 | Huang et al. | |
| 5,626,901 A | 5/1997 | Ambjerg Pedersen | |
| 5,659,000 A | 8/1997 | Cain et al. | |
| 5,759,609 A | 6/1998 | Lynch | |
| 2,869,125 A | 2/1999 | Lynch et al. | |
| 5,885,646 A | * 3/1999 | Wong et al. | 426/633 |
| 6,010,737 A | 1/2000 | Meade | |
| 6,113,976 A | 9/2000 | Chiou et al. | |
| 6,156,369 A | 12/2000 | Eger et al. | |
| 6,171,624 B1 | 1/2001 | Reddy et al. | |
| 6,203,841 B1 | 3/2001 | Lynch et al. | |
| 6,306,449 B1 | * 10/2001 | Reddy et al. | |

OTHER PUBLICATIONS

International Search Report dated Nov. 2, 2001 (PCT/US01/19388).

"Votator II Scraped Surface heat Exchangers," Heat Exchanger Brochure Product Literature, Waukesha Cherry–Burrell, Delavan, WI, pp. 1–11 (1998).

Dimensional Data sheet, Waukesha Cherry–Burrell, Delavan, WI (1998).

"Waukesha Cherry–Bushnell Products: Votator," Waukesha Cherry–Burnell, 2 pages, (Jun. 5, 2001) http://www/gowcb.com/products/heatex/votator.htm.

* cited by examiner

Primary Examiner—Carolyn Paden
(74) Attorney, Agent, or Firm—Sterne, Kessler, Goldstein & Fox P.L.L.C.

(57) ABSTRACT

The present invention relates to a corn syrup composition that can be used in many applications in place of butter, margarine or other spreadable products. The corn syrup composition is lower in fat than conventional spreads, provides a pleasing flavor and is compatible with many flavoring and coloring options. The formulation combines a corn syrup component, such as high fructose corn syrup, with a fat/oil component, such as butter or other fats. The formulation may also include other flavorings, preservatives, emulsifiers and anti-oxidant ingredients. The formulation may be utilized in any food application but is preferably utilized as a coating, spread or as a cooking or baking ingredient.

23 Claims, No Drawings

REDUCED FAT SPREADABLE CORN SYRUP COMPOSITIONS AND METHODS OF PREPARATION THEREOF

CROSS-REFERENCE TO RELATED APPLICATION

This application claims priority to and incorporates by reference herein the entire contents of U.S. Provisional Application Serial No. 60/213,406, filed Jun. 22, 2000.

FIELD OF THE INVENTION

The present invention relates to spreadable corn syrup compositions and their methods of preparation. Generally, the corn syrup compositions of the present invention comprise corn syrup, fats and/or oils, such as butter, or vegetable oils, and optionally additional flavorings and preservatives.

BACKGROUND OF THE INVENTION

With a greater understanding of the part that dietary fats play in the development of cardiovascular disease and other health concerns, many consumers have been trying to alter their eating habits. The health benefits of a low fat diet are well documented and well accepted. A significant source of dietary fat is the use of spreads such as butter or margarine. One way to reduce the fat content of such spreads is to replace some of the fat with sweeteners, such as corn syrup. Aside from being lower in fat, sweetened spreads are generally lower in calories than unaltered butter or margarine.

The mixing of some sweeteners with fats and/or oils may produce a number of undesirable characteristics in spread or syrup products. For example, mixing granulated or powdered sugars with fats and/or oils tends to create an undesirable texture that is unappealing to many consumers. Therefore many sweetened spreads use liquid sweeteners. However, the mixing of liquid sweeteners with fats or oils has been proven difficult to adequately disperse the two types of ingredients. While relatively small amounts of one component may disperse evenly with large amounts of the other component the task becomes more difficult when utilizing large amounts of each component.

Fats/oils do not normally mix well with most water based liquid ingredients, a common example is that of vinegar and oil used as a salad dressing. To keep the aqueous ingredients, which would include the liquid corn syrups and sweeteners, mixed with the oil type ingredients, which would include butter and oils of various types, it is beneficial to create an emulsion of the two different ingredients. Industry refers to the ingredients as falling into either the aqueous phase or the oil phase.

Emulsion technology can be done by any of several methods. One such method is to create an emulsion by utilizing mechanical technology. Embodiments of the present invention utilize a mechanical process to create an emulsion. However, the present invention may also utilize the other techniques available to create such an emulsion or combinations thereof. Other emulsion technology uses any of several chemical agents that help keep the oil and aqueous phases of ingredients from separating. It is envisioned that commercially a combination of the chemical and mechanical emulsifying methods would be used to make the spread of the present invention stable under a wider range of conditions, ingredient compositions, and applications.

In many types of spread compositions honey is utilized to add flavor and sweetness. Honey is a common liquid sweetener utilized in spreads and syrups. For example, honey butter is a sweetened spread that has probably existed for centuries. The composition is made by mixing honey with melted butter or margarine. There are many recipes that exist in the formulation of honey-butter compositions. They vary primarily in the proportions of honey and butter or margarine used. However, honey butter is relatively expensive due to the high cost of honey.

Honey butter can also present problems for some who may eat it. Ingestion of honey by very young children can be a concern because honey sometimes contains bacteria. In particular, occasionally honey contains the bacterium clostridium botuli. This is a particular concern when honey is ingested by very young children whose stomach fluids lack sufficient acidity to kill the botulinum bacteria. The bacteria then colonize the digestive tract and produce botulinum toxin and create a form of botulism poisoning from within.

Furthermore, honey has a distinctive flavor and amber color, which is desirable in some circumstances, but less desirable in others. Therefore, preparing food that is to highlight other flavors and/or colors may be inhibited by the distinct flavor and color of honey.

SUMMARY OF THE INVENTION

The present invention relates to a spreadable corn syrup composition. Generally, the composition is produced in a sweetened spread and can be used in many applications in place of products such as butter, margarine, jelly, jam, honey or other similar products. Furthermore, the composition of the present invention may be utilized for baking, marinating, basting or any other cooking and/or food preparation application.

The corn syrup spread is lower in fat and cholesterol than conventional syrups or spreads, but still provides a pleasing flavor and is compatible with many flavoring and coloring options. It generally is produced as a butter or margarine like spread. Moreover, corn syrup is microbially sterile and eliminates the risk posed by bacterial contamination of similar products, such as honey.

The corn syrup spread of the present invention includes 25% to 75% by weight corn syrup, preferably high fructose corn syrup, 25% to 75% fats and/or oils and optionally .1% to 10% preservatives and flavorings. The fat and/or oil is preferably butter or margarine but may include vegetable oil, such as corn oil, or other edible fats. Preservatives may include any preservative known to those skilled in the food arts including, but not limited to, potassium sorbate, sodium benzoate or any other preservatives.

Additionally, the spreadable corn syrup composition of the present invention may include flavorings. A large variety of flavorings are compatible with the corn syrup composition of the present invention allowing for a great variety of applications ranging from fruit jelly and jam substitutes to garlic and onion flavored products.

In general, a mechanical technology is utilized to produce the corn syrup composition of the present invention. In various embodiments of the present invention, the fat/oil phase (butter) is heated to 80–110° F. so as to melt the butter and concurrently the aqueous phase (high fructose corn syrup) was also heated to a similar temperature of 90–120° F. Next, the oil phase ingredients are continuously agitated while the aqueous phase ingredients are slowly added to the oil phase ingredients. This resulting emulsion is then continuously agitated and then cooled to stabilize the emulsion into a solid form. Flavorings, emulsifiers and other ingredients may be optionally added to the oil or aqueous phases during the process. A preferable form of equipment used to create this type of emulsion is a scraped surface agitated heat exchanger or more commonly called by the brand name of the equipment a "Votator."

DETAILED DESCRIPTION OF THE INVENTION

The present invention is a food product formulation, which generally combines corn syrup or high fructose corn syrup with fats and/or oils, such as butter or vegetable oil. The formulation may also optionally include other flavorings, preservatives, emulsifiers, thickeners, vitamins, minerals and anti-oxidant ingredients. For example, other ingredients used in the composition of the present invention include, but are not limited to, salt, potassium sorbate, sodium benzoate, ascorbic acid, oil of orange, various sugars and sweeteners, citrus flavors, spices, fruit flavors, tropical flavors, melon flavors, berry flavors, nut flavors, vegetable flavors, and topping flavors. Topping flavors include caramel, butterscotch, and the like. The formulation may be utilized in any food application but is preferably utilized as a coating, spread, cooking or baking ingredient.

As previously mentioned, the corn syrup composition of the present invention includes a corn syrup component. The corn syrup component utilized in the preparation of the corn syrup spread preferably contains a range of generally 42% to 55% fructose content. The corn milling industry currently produces corn sweeteners with a fructose level of either 42% or 55% and most of the remaining portion of the product is dextrose. Either of these products work very well in the composition and both of these standard products add sweetness properties to the composition. It is noted that a mixture of corn syrup products that contain varying amounts of fructose may be utilized in various embodiments of the present invention to create the proper sweetness desired for each particular product.

Corn syrup products may be produced that contain varying amounts of sugars, such as fructose, dextrose, maltose or other sugars. Dextrose does not have as high a sweetness level as fructose. Therefore, the products higher in dextrose do not add the same level of sweetness as the high fructose syrups. This is very helpful if the desired end product application is for a lower sweetness level. The corn syrup industry also produces several different levels of corn syrups that vary the levels of starch conversion into sugars, dextrose in this case. This conversion process also gives the corn syrup different properties as to sweetness and viscosity. The lower the conversion of starch to dextrose, or other sugars, the lower the sweetness level and the higher the viscosity level.

Currently the corn syrup industry produces some typical standard products in the ranges of 25% dextrose equivalent (DE) up to 63%DE. The 25%DE product is not very sweet but is extremely thick and viscous. The 63%DE product is sweeter and a much more flowable product. The 63%DE product still has much less sweetness and is less flowable than either of the two standard fructose products currently being produced. There are several standard products corn syrup products produced, 25%DE, 36%DE, 43%DE, 45%DE, 55%DE and 63%DE. It is possible to make corn syrup up to 95%DE. Various embodiments of the present invention includes the whole scope and range of corn syrup products and grades currently available as well as combinations thereof.

The edible corn syrup composition also comprises a fat/oil component, which includes one or more fats and/or oils. The fats and/or oils that may be utilized in the corn syrup composition include, but art not limited to butter, margarine, milk fats, vegetable oils, vegetable shortenings, hydrogenated fats and oils, animal fats and oils and other oils, such as soybean oil, cottonseed oil, corn oil, ground nut oil such as peanut oil, sunflower oil, safflower oil, olive oil, canola oil, palm oil and any other edible oil.

A number of embodiments of the corn syrup composition of the present invention utilizes butter. Butter fat typically makes a very hard product when chilled to normal refrigerator temps of 35° F-45° F. Various embodiments of the present invention replace up to 40% of the butterfat in the composition with corn oil, a product that is free flowing at normal refrigerator temperatures. This replacement assists in improving the spreadability of the composition straight from the refrigerator. Several other fats or oils could have been used or the fats or oils could have been modified to produce different spreading characteristics. Such variations in the types of fats or oils utilized depends on the application or end use of the composition.

Additionally, the corn syrup composition of the present invention may optionally include one or more flavorings. The flavorings may include liquid flavorings and flavor extracts as well as fruit or vegetable purees. Natural flavoring as well as artificial flavoring may be employed. Flavorings specifically contemplated in the invention include, but are not limited to, grapefruit, orange, lemon, lime, tangerine, cinnamon, clove, garlic, jalapeno, peppermint, spearmint, apple, green apple, apricot, cherry, grape, peach, pear, banana, coconut, guava, kiwi, mango, papaya, passion fruit, pineapple, cantaloupe, honeydew, watermelon, blackberry, boysenberry, cranberry, elderberry, gooseberry, raspberry, strawberry, almond, peanut, peanut butter, pecan, walnut, black walnut, carrot, celery, chives, cucumber, eggplant, green onion, tomato, butterscotch, caramel, chocolate, hot fudge, praline, toffee, bubble gum, cola, eggnog, licorice, maple, popcorn, ranch, root beer, rum, sour cream, vanilla, and vinegar.

The edible corn syrup composition of the present invention may also include one or more preservatives. Preservatives preferred in making the compositions of the present invention include potassium sorbate, sodium benzoate or a combination of both. However, other preservatives may be utilized in the present invention including, but not limited to, BHA, butylated hydroxytoluene (BHT), tocopherol and other antioxidants, various sulfites and nitrites and other preservatives known to those skilled in the art.

Emulsifiers may also be added to the composition to assist in the dispersion of the various ingredients. Emulsifiers utilized in the present invention include, but are not limited to, glycerol esters, propylene glycol ester emulsifiers such as propylene glycol monstearate, sorbitan esters such as sorbitan monostearate, and ethoxylated fatty acid esters such as ethoxylated mono- and diglyceride.

Depending on the intended use for the product the proportion of corn syrup to fat may be adjusted to achieve the desired level of sweetness and texture. For example, a fruit flavored spread intended for use on bread may be preferred to be sweeter than a spread that will be garlic flavored for use on bagels or garlic bread.

The composition generally contains 25% to 75% corn syrup, high fructose corn syrup or a combination of the two, along with 25% to 75% fats and/or oils, such as butter, margarine, vegetable oil, or similar products. In addition, there may be 0% to 10% flavorings, 0% to 5% emulsifiers, and 0% to 15% other added ingredients. Preferably, the formulation includes 35% to 65% corn syrup or high fructose corn syrup, 35% to 65% fats and/or oils, .05% to 7% flavoring, .05% to 4% emulsifiers, and .05% to 10% other added ingredients. Most preferably, the formulation includes 45% to 55% corn syrup or high fructose corn syrup, 45% to 55% fats and/or oils, .1% to 5% flavoring, .1% to 3% emulsifiers, and .1% to 5% other added ingredients.

In preparation of the corn syrup composition, the composition generally includes two phases in an emulsion, an aqueous phase and an oil phase. When the aqueous phase (corn syrup component) is added to the oil phase (fats/oil component), placing the oil phase (fat/oil component) on the outside of the emulsion, the emulsion takes on the characteristics of the oil phase, which produces a spread like composition. When the phases are reversed by adding the oil phase (fat/oil component) to the aqueous phase (corn syrup component), the aqueous phase is on the outside. The emulsion then takes on the characteristics of the aqueous phase, which is similar to the characteristics of a pourable sweet buttery syrup. Each variation of the products can be utilized to create numerous embodiments.

The corn syrup spread of the present invention can be prepared using any type of mixing scraped surface heat exchanger equipment. The preferred equipment is a Votator® of the type sold by Waukesha Cherry-Burrell Products of Delavan, Wis. This provides the ability to heat and cool the product and agitate it as appropriate.

The general process for preparing the corn syrup spread is as follows: Using low heat, generally, lower than 180° to 200° F., and agitation to prevent scorching, a corn syrup component is heated to a temperature of approximately 90° to 120° F., preferably approximately 105° F. Salt, preservatives and/or other water miscible substances are added to the heated corn syrup component and mixed until completely dissolved and/or dispersed. Again using low heat, a fat/oil component is simultaneously heated to a temperature of approximately 80° to 110° F., preferably approximately 90° F. Next, emulsifiers, colorings and/or flavorings may be added to either the corn syrup component mixture or the fat/oil component mixture and mixed until completely dispersed. It is preferable to add water miscible colorings, emulsifiers and flavorings to the corn syrup mixture and oil miscible emulsifiers, flavorings and colorings to the fats and/or oil mixture. Then, the heated corn syrup mixture and the fats/oils mixture are very slowly combined and the combination constantly agitated during and after mixing to create an emulsion. The speed, power, and type of agitation determines how fast the combining can go. A large mixer would produce several tons per hour while smaller amounts such as 6 lbs are produced in approximately 3 minutes. Once completely mixed, the resulting emulsion is then immediately cooled while continuing constant agitation. Cooling may be accomplished utilizing ice water baths or any other cooling technique know in the art. Additionally, a heat exchanger, such as the votator may be utilized to cool the mixture. Utilization of such a device may only take a few seconds to cool. Generally, the initial temperature is reduced to about 50°–80° F. However, the temperature that the product is cooled to would be somewhat dependant on the composition of the spread. A product using more low DE corn syrup(for example, the 25%DE product) would not need to be cooled as much so as to stabilize the emulsion as the composition including 55% fructose corn syrup. Additionally a product using more oil would need to be cooled to a lower temperature than products using butter or some other fat/oil that is solid at room temperatures. Finally, the resulting spread may then be placed in containers for distribution and use. It is noted that generally, the product is stored under normal refrigeration conditions, but also may be kept at room temperature.

In the examples below flavorings are added to the oil phase of the invention prior to mixing with the aqueous phase. However, it is noted that the flavorings and other components added to the corn syrup component or fat/oil component may be water miscible or oil miscible. Therefore, as previously suggested, the flavorings, emulsifiers, antioxidants, colorings, etc., may be added to the oil phase or corn syrup phase of the emulsion depending upon the characteristics of these ingredients. Again, it is preferred that oil miscible flavors be added to the oil phase during the preparation process and that water miscible flavors be added to the aqueous phase. The addition of the flavoring to either the fats/oil component or corn syrup component may change the inclusion sequence of the product based upon which mixture would have the optimum effect on delay or acceleration of the flavors taste in the mouth of the consumer. It is noted that the flavorings and colorings may also be added after mixture of the corn syrup and fats/oil phases, but better results have been found if the flavorings and colorings are added before mixture of these two phases.

Optionally, after the corn syrup composition is cooled, the composition may be whipped and air added to the product to make it fluffier and easier to spread. Nitrogen or other reasonable inert gasses may be added to provide the additional air volume in the product. This process makes the product appear to have more volume and will fill a larger container. The process also tends to give the product a lighter appearing color. The votator generally has an attachment called a pin worker that does this whipping. Compositions of the present invention may be whipped by including 0% to 300% gas in the composition. However, approximately 5% to 20%, preferably 10% to 15%, gas is normally added to the product.

As previously mentioned, the compositions of the present invention have many applications including, but not limited to, spreads, baking, basting, marinades and sauces. However, it is also noted that any cooking or food preparation application may utilize the compositions of the present invention.

The following examples further illustrate the present invention. These examples are not intended to limit the scope of the invention.

EXAMPLE 1

| | |
|---|---|
| High fructose corn syrup | 3 lb. |
| Butter | 3 lb. |
| Salt | 9 gm. |
| Potassium sorbate | 2 gm. |

Procedure 1

Using low heat and agitation to prevent scorching, high fructose corn syrup was heated to a temperature of 105° F. Salt and potassium sorbate were added to the heated corn syrup and mixed until completely dissolved. Again using low heat, butter was simultaneously heated to a temperature of 90° F. Once both phases were heated, the heated corn syrup mixture was very slowly added to the butter and the combination constantly agitated during and after mixing to create an emulsion. The resulting emulsion was then immediately cooled to a temperature of 65° F. while continuing constant agitation. Cooling was accomplished in an ice water bath. The resulting spread was then placed in containers. The product was finally stored at normal refrigerator temperatures of 36° to 45° F. The equipment used in all examples was a Votator® but other types of scraped surface heat exchanger/mixers may be applicable as well.

EXAMPLE 2

| High fructose corn syrup | 3 lb. |
|---|---|
| Butter | 2 lb. |
| Corn oil | 1 lb. |
| Salt | 9 gm. |
| Potassium Sorbate | 2 gm. |

Procedure 2

Using low heat and agitation to prevent scorching, high fructose corn syrup was heated to a temperature of 105° F. Salt and potassium sorbate were added to the heated corn syrup and mixed until completely dissolved. Also using low heat, the corn oil and butter were mixed using constant agitation and heated to a temperature of 90° F. Next, the heated corn syrup mixture was very slowly added to the heated corn oil-butter mixture and the combination constantly agitated during and after addition to create an emulsion. The resulting emulsion was then immediately cooled while continuing constant agitation to a temperature of 65° F. Cooling was accomplished in an ice water bath. The resulting spread was then placed in containers. The product was finally stored at normal refrigerator temperatures of 36° to 45° F.

EXAMPLE 3

| High fructose corn syrup | 3 lb. |
|---|---|
| Buffer | 3 lb. |
| Salt | 9 gm. |
| Potassium Sorbate | 2 gm. |
| Oil of orange | 1 tsp. |

Procedure 3

Using low heat and agitation to prevent scorching, high fructose corn syrup was heated to a temperature of 105° F. Salt and potassium sorbate were added to the heated corn syrup and mixed until completely dissolved. Again, using low heat, oil of orange and butter were mixed and heated to a temperature of 90° F. Next, the heated corn syrup mixture was very slowly added to the heated corn oil—oil of orange mixture and the combination constantly agitated during and after addition to create an emulsion. The resulting emulsion was then immediately cooled while continuing constant agitation to a temperature of 65° F. Cooling was accomplished in an ice water bath. The resulting spread was then placed in containers. The product was finally stored at normal refrigerator temperatures of 36° to 450 F.

EXAMPLE 4

| High fructose corn syrup | 3 lb. |
|---|---|
| Butter | 2 lb. |
| Corn oil | 1 lb. |
| Salt | 9 gm. |
| Potassium Sorbate | 2 gm. |
| Oil of orange | 1 tsp. |

Procedure 4

Using low heat and agitation to prevent scorching, high fructose corn syrup was heated to a temperature of 105° F. Salt and potassium sorbate were added to the heated corn syrup and mixed until completely dissolved. Again, using low heat, the corn oil, oil of orange and butter were mixed and heated to a temperature of 90° F. Next, the heated corn syrup mixture was very slowly added to the heated corn oil-butter-oil of orange mixture and the combination constantly agitated during and after addition to create an emulsion. The resulting emulsion was then immediately cooled while continuing constant agitation to a temperature of 65° F. Cooling was accomplished in an ice water bath. The resulting spread was then placed in containers. The product was finally stored at normal refrigerator temperatures of 36° to 45° F.

The present invention may be embodied in other specific forms without departing from the spirit of the essential attributes thereof, therefore, the illustrated embodiments should be considered in all respects as illustrative and not restrictive, reference being made to the appended claims rather than to the foregoing description to indicate the scope of the invention.

What is claimed is:

1. A reduced fat edible spread/syrup composition comprising:
    35% to 65% of a corn syrup component,
    35% to 65% of a fat/oil component, and
    less than 30% of a third component including one or more substances selected from a group consisting of flavorings, emulsifiers, thickeners, antioxidants, vitamins, minerals, colorings and preservatives, wherein said components are emulsified within said composition.

2. The composition of claim 1, wherein the corn syrup component is selected from a group consisting of corn syrup, high fructose corn syrup or a combination thereof.

3. The composition of claim 1, wherein the fat/oil component is selected from a group consisting of butter, margarine, milk fats, vegetable oils, vegetable shortenings, animal oils or a combination thereof.

4. The composition of claim 1, wherein the composition comprises from 45% to 55% of said corn syrup component and from 45% to 55% of said fat/oil component.

5. The composition of claim 1, wherein the corn syrup component is high fructose corn syrup.

6. The composition of claim 1, wherein the fat/oil component is butter.

7. The composition of claim 1, in which said flavoring includes one or mote substances selected from a group consisting of citrus flavors, spices, tropical fruits, melons, berries, nuts and vegetables.

8. The composition of claim 1, in which said flavoring includes one or more substances selected from a group consisting of grapefruit, lemon, lime, tangerine, cinnamon, clove, garlic, jalapeno, peppermint spearmint, apple, green apple, apricot, cherry, grape, peach, peer, banana, coconut, guava, kiwi, mango, papaya, passion fruit, pineapple, cantaloupe, honeydew, watermelon, blackberry, boysenberry, cranberry, elderberry, gooseberry, raspberry, strawberry, almond, peanut, peanut butter, pecan, walnut, black walnut, carrot, celery, chives, cucumber, eggplant green onion, tomato, butterscotch, caramel, chocolate, hot fudge, praline, toffee, bubble gum, cola, eggnog, licorice, maple, popcorn, ranch, root beer, rum, sour cream, vanilla and vinegar.

9. The composition of claim 1 further including the addition of a gas.

10. The composition of claim 9 wherein the gas is air or nitrogen.

11. A method of preparing a corn syrup spread composition comprising the steps of:

(a) heating a corn syrup component;

(b) heating a fat/oil component;

(c) combining the corn syrup component and the fat/oil component with agitation to produce an emulsion; and (d) cooling the emulsion;

wherein prior to step (c), one or more water miscible components are combined with the corn syrup component and/or one or more oil miscible components are combined with the fat/oil component; and wherein the corn syrup spread composition comprises from 35% to 65% of the corn syrup component, from 35% to 65% of the fat/oil component and less than 30% of the water miscible anchor oil miscible component including one or more substances selected from a group consisting of flavorings, emulsifiers, antioxidants, vitamins, minerals, colorings, and preservatives.

12. The method as claimed in claim 11, wherein the emulsion is cooled with continual mixing.

13. The method as claimed in claim 11, wherein the corn syrap component is heated to a temperature of approximately 90° to 120° F.

14. The method as claimed in claim 11, wherein the fat/oil component is heated to a temperature of approximately 800° to 100° F.

15. The method as claimed in claim 11, wherein the corn syrup component is high fructose corn syrup.

16. The method as claimed in claim 11, wherein the water miscible components or oil miscible components include one or more flavors selected from a group consisting of grapefruit, lemon, lime, tangerine, cinnamon, clove, garlic, jalapeno, peppermint, spearmint, apple, green apple, apricot, cherry, grape, peach, pear, banana, coconut, guava, kiwi, mango, papaya, passion fruit, pineapple, cantaloupe, honeydew, watermelon, blackberry, boysenberry, cranberry, elderberry, gooseberry, raspberry, strawberry, almond, peanut, peanut butter, pecan, walnut, black walnut, carrot, celery, chives, cucumber, eggplant, green onion, tomato, butterscotch, caramel, chocolate, hot fudge, praline, toffee, bubble gum, cola, eggnog, licorice, maple, popcorn, ranch, root beer, rum, sour cream vanilla and vinegar.

17. The method as claimed in claim 11, wherein the water miscible components include salt and potassium sorbate.

18. The method as claimed in claim 11, wherein the corn syrup component is selected from the group consisting of corn syrup, high fructose corn syrup or a combination thereof.

19. The method as claimed in claim 11, further comprising the step of refrigerating the emulsion.

20. The method as claimed in claim 19, in which the refrigeration is at temperatures between 36–40° F.

21. The method as claimed in claim 11, further including whipping the corn syrup composition with a gas.

22. The method as claimed in claim 21 wherein the gas is air or nitrogen.

23. The method of claim 11, wherein said one or more oil miscible components includes one or more substances selected from the group consisting of citrus flavors, spices, fruit flavors, tropical fruit flavors, melon flavors, berry flavors, nut flavors, and vegetable flavors.

* * * * *

UNITED STATES PATENT AND TRADEMARK OFFICE
CERTIFICATE OF CORRECTION

PATENT NO. : 6,692,789 B2
DATED : February 17, 2004
INVENTOR(S) : Reed T. Ethington, Jr. and Tedford A. Gillett It is certified that error appears in the above-identified patent and that said Letters Patent is hereby corrected as shown below:

Column 7,
Line 33, change "Buffer" to -- Butter --.

Column 8,
Line 52, change "peer" to -- pear --.
Line 57, after "eggplant", insert -- , --.

Column 9,
Line 14, change "anchor" to -- and/or --.
Line 21, change "syrap" to -- syrup --.
Line 24, change "800" to -- 80 --.

Signed and Sealed this

Sixth Day of July, 2004

JON W. DUDAS
*Acting Director of the United States Patent and Trademark Office*